(12) United States Patent
Gilstring

(10) Patent No.: US 8,789,483 B2
(45) Date of Patent: Jul. 29, 2014

(54) SEED SINGULATOR HOUSING AND AGRICULTURAL MACHINE EQUIPPED WITH IT

(75) Inventor: Gert Gilstring, Skänninge (SE)

(73) Assignee: Väderstad-Verken AB, Väderstad (SE)

(*) Notice: Subject to any disclaimer, the term of this patent is extended or adjusted under 35 U.S.C. 154(b) by 95 days.

(21) Appl. No.: 13/389,496

(22) PCT Filed: Sep. 9, 2010

(86) PCT No.: PCT/SE2010/050956
§ 371 (c)(1),
(2), (4) Date: Apr. 17, 2012

(87) PCT Pub. No.: WO2011/031214
PCT Pub. Date: Mar. 17, 2011

(65) Prior Publication Data
US 2012/0186505 A1    Jul. 26, 2012

(30) Foreign Application Priority Data
Sep. 14, 2009   (SE) ...................................... 0901181

(51) Int. Cl.
*A01C 7/04*   (2006.01)
(52) U.S. Cl.
USPC .......................................... 111/185; 111/179
(58) Field of Classification Search
USPC ............ 111/179, 178, 177, 170, 14, 180–185
See application file for complete search history.

(56) References Cited

U.S. PATENT DOCUMENTS

| | | |
|---|---|---|
| 3,156,201 A | 11/1964 | Tweedale |
| 3,885,704 A | 5/1975 | Lienemann et al. |
| 3,888,387 A | 6/1975 | Deckler |
| 4,026,437 A | 5/1977 | Biddle |
| 4,047,638 A | 9/1977 | Harrer et al. |
| 4,091,964 A | 5/1978 | Harrer |
| 4,688,698 A | 8/1987 | Holland |
| 4,898,108 A | 2/1990 | McDermott |
| 5,156,102 A | 10/1992 | Andersen |
| 5,231,940 A | 8/1993 | Tjeerdsma |
| 5,392,722 A | 2/1995 | Snipes et al. |
| 5,799,598 A | 9/1998 | Stufflebeam et al. |
| 2003/0154892 A1 | 8/2003 | Crabb et al. |
| 2006/0278726 A1 | 12/2006 | Holly |

FOREIGN PATENT DOCUMENTS

| | | |
|---|---|---|
| DE | 10 2006 010 325 | 9/2007 |
| EP | 0 141 638 | 5/1985 |
| EP | 0 598 636 | 5/1994 |
| FR | 1.503.687 | 10/1967 |

OTHER PUBLICATIONS

International Search Report issued on Oct. 28, 2010 in International Application No. PCT/SE2010/050956 filed Sep. 9, 2010.

*Primary Examiner* — Christopher J Novosad
(74) *Attorney, Agent, or Firm* — Drinker Biddle & Reath LLP

(57) ABSTRACT

A sow housing for piecemeal sowing of seeds. The sow housing includes a seed bin and a rotating seed element having a wall that has a plurality of through holes. Each hole is arranged to, during a first part of the revolution of the hole, retain a seed as a consequence of pressure difference between the two sides of the wall. A cover is arranged to cover each hole during a second part of the revolution of the hole.

13 Claims, 8 Drawing Sheets

FIG. 9
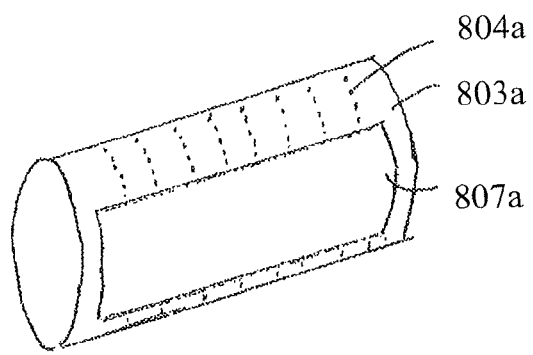
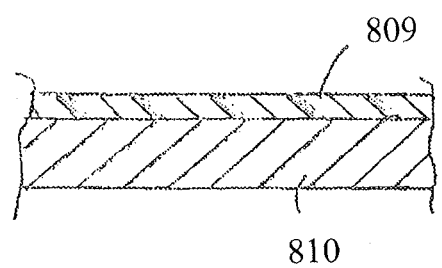
FIG. 10

US 8,789,483 B2

SEED SINGULATOR HOUSING AND AGRICULTURAL MACHINE EQUIPPED WITH IT

CROSS REFERENCE TO RELATED APPLICATIONS

This application is the National Stage of International Application No. PCT/SE2010/050956, filed Sep. 9, 2010, and claims benefit of Swedish Application No. 0901181-8, filed Sep. 14, 2009, both of which are herein incorporated by reference in their entirety.

FIELD OF THE INVENTION

The present invention relates to a sow housing for piecemeal sowing of seeds, which sow housing comprises a seed holder and a rotating seed element having a wall that has a plurality of through holes, each hole being arranged to, during a first part of the revolution of the hole, retain a seed as a consequence of pressure difference between the two sides of the wall, which pressure difference is accomplished by a positive pressure being maintained on the side of the wall where the seeds are situated, and each hole being arranged to, during a second part of the revolution of the hole, pass a release area for the removal of seed from the hole.

BACKGROUND OF THE INVENTION

Sow housings of the kind in question are used in planters where the seeds are sowed singulated one by one.

In that connection, there are requirements of capacity, simplicity to handle the machines and the sow precision that the machines deliver. In order to provide good conditions for the crops and the harvest, it is particularly required that the machines should sow the seeds at a great accuracy regarding the position of the seeds in depth and their mutual spacing. In addition, it is desirable that such an accuracy is obtained at as high a speed of motion as possible. U.S. Pat. No. 3,888,387 and U.S. Pat. No. 4,047,638 disclose planters having singulating discs. Such planters comprise seed metering devices, each one of which comprising a seed element in the form of a round seed disc, also called singulating disc, which is rotatable around a concentric seed metering shaft and provided with a plurality of through retention openings in the form of holes situated at the same radial distance from the seed metering shaft. The singulating disc constitutes, or provides, a wall that forms a barrier, i.e., a partition or delimitation, between two areas distributed on the respective sides of the disc. One of the areas communicates with a pressure-actuating device in the form of a fan for providing a positive pressure, wherein normal pressure prevails in the other area. By means of the pressure difference, the disc sucks fast a seed in each hole. In the rotation of the disc, each hole passes bristles or spikes the purpose of which is to pick away double seeds which may attach at some holes. At a defined location of the revolution of the disc, the pressure difference is put out of operation, the seed falling away and falling down into the drill furrow in the ground.

A limitation of the machine type described above is that each drill row has one singulating disc and consequently each row has one bin for seeds. Since the machines tend to become wider and wider, a machine gets many bins; there are machines with more than 30 bins for seeds. For a user, it is cumbersome and time-consuming to fill so many small bins. DE 10 2006 010325, EP 598 636, U.S. Pat. No. 5,392,722, FR1503687, U.S. Pat. No. 5,231,940, U.S. Pat. No. 5,156,102 and U.S. Pat. No. 3,885,704 disclose planters embracing a seed metering device comprising a seed element in the form of a drum, which forms a cylindrical casing and which is rotatable around a concentric seed metering shaft. The casing is provided with through retention openings in the form of holes distributed in a plurality of arrays distributed along the seed metering shaft, each one of which extends in the circumferential direction of the casing. The drum constitutes, or provides, a wall that forms a barrier between two areas distributed inside and outside, respectively, the casing. The area outside the drum communicates with a fan for providing a positive pressure, wherein normal pressure prevails inside the casing. By means of the pressure difference, the drum sucks fast a seed in each hole. In an area through which the holes pass and in which a decrease of the pressure difference is accomplished, e.g., by means of a special roll or a separating flexible wall, the seeds are released as they are brought through the area. From the drum, the seeds are conveyed from each hole array by air through a respective line to a respective seed nozzle, which mouths directly in or above a drill furrow, which most often is opened by two inclined discs.

Such a drummed planter has the advantage that a drum and a seed bin serve a plurality of drill rows. This means that a machine having many drill rows still can have few bins.

Common to the two main types of planters, i.e., with singulating disc and drum, respectively, is that pneumatics is utilized for several purposes. On one hand, the transportation of seeds from the central bin takes place pneumatically, and on the other hand pneumatics is utilized for the seed metering process.

Additional examples of devices that relate to seed metering are disclosed in EP 0141638, U.S. Pat. No. 5,799,598, U.S. Pat. No. 4,898,108, U.S. Pat. No. 4,091,964, U.S. Pat. No. 4,026,437 and U.S. Pat. No. 3,156,201.

A problem of positive pressure systems, irrespective of whether it is about sow housings having plane seed discs or seed drums, is the high power requirement of the fan system, which often is hydraulically driven. Together with other hydraulics of these sowing machines, the power requirement of the hydraulic system is often so high that the capacity of a common standard tractor is not always sufficient. This means that the capacity of the tractor has to be specified before the manufacture of the same, and in other words be bought simultaneously with the contemplated sowing machine.

A great part of the power loss that arises in a sow housing having positive pressure over a seed element such as a seed disc or a seed drum is the air leakage that arises in the holes of the seed element that do not contain seed. This is the case for the holes of the seed element that are in the sector that lies between the area where seeds clear from the seed element and the seed reception area of the seed element where the holes are filled with seeds.

The object of the present invention is to eliminate or at least reduce the power loss that arises because of air leakage through the holes of the seed element.

DESCRIPTION OF THE INVENTION

The object set forth is achieved by the present invention by a sow housing of the kind indicated by way of introduction having the special features that a cover means is arranged to cover each hole during a third part of the revolution of the hole, which third part is ⅛-½ of a revolution.

By the cover means, air leakage through the holes that are covered by the same is prevented or reduced. It is optimal that the cover means, in the circumferential direction, extends across the entire part of the revolution of a hole in which no seed covers the hole. A considerable decrease of the power loss is achieved even if the cover means does not extend completely over the entire part, e.g., if constructive considerations of space limit that option. Also an extension in the range of 75-100% gives a significant decrease of the power loss.

An additional positive effect by this solution is that the air current and hence the turbulence in the sow housing decrease. This means a decreased risk of the seed trapped in a hole being disturbed by the air agitation in the sow housing. A disturbance may result in a seed clearing from a hole in an incorrect position on the seed disc or seed drum, or that a seed is brought by the air current and the turbulence beside and past the inlet to the seed hose, in both cases this causes a "skip".

Even if it does not cause a "skip", the turbulence may still impair the precision of the seed distribution in the drill row. This is because the turbulence may disturb the instant of time when a seed clears from the seed element, or affect the instant of time when the seed is introduced into the seed hose, or disturb the path of the seed so that the same bounces against the inlet edge of the seed hose and becomes delayed. In all cases, the distribution of seeds in the drill row is affected negatively so that the spacing between seeds exhibits a greater variation.

According to a preferred embodiment, said third part constitutes ¼-½ of a revolution.

As the sector during which the seeds are on the holes of the seed element constitutes approx. 90°-180° of the circumference, it is expedient that the cover means in this way extends across the corresponding complementary part of the revolution.

According to an additional preferred embodiment, the cover means is arranged on the same side of the wall at which the seeds are retained.

This gives constructive advantages, among other things from a space point of view. Particularly in case of a drum-shaped seed element, where the seeds normally are retained on the outside of the drum, it becomes easier to apply the cover means on that side. In addition, then the pressure difference contributes to improved abutment.

According to an additional preferred embodiment, the cover means is arranged to abut resiliently against the wall.

The resilience provides an efficient sealing of the holes without requiring a close-tolerance fit of the cover means in relation to the seed element. In addition, the risk is eliminated that the cover means will entirely or partly abut by too a great force against the seed element, which results in friction loss.

According to an additional preferred embodiment, the cover means is inherently resilient.

Thereby, the resilient function is achieved in a simple way. By the fact that the cover element has a great extension for covering an array of several holes, the inherent resilience entails that sealing abutment is guaranteed over the extension of the entire cover means.

According to an additional preferred embodiment, a separate spring means is arranged for biasing the cover means against the wall.

This may constitute a complement to the cover means being inherently resilient and contributes to further improve the sealing capacity. Biasing by a separate spring may in certain applications be an alternative to the cover means being inherently resilient.

According to an additional preferred embodiment, the cover means is of two different materials.

Thereby, the cover means can be optimized material-wise for fulfilling different aspects of its function, with a certain material adapted to the abutting sealing function, another to the supporting function, which other material also may be adapted to provide resiliency.

According to an additional preferred embodiment, the cover means is at least partly of a plastic material having a low coefficient of friction on the side that faces the seed element.

Thereby, it is attained that the friction loss because of the abutment of the cover means against the seed element is limited to a moderate level. With a low friction, in this connection reference is made to a coefficient of friction less than 0.2.

According to an additional preferred embodiment, the seed element comprises a disc forming the wall thereof.

According to an additional preferred embodiment being an alternative to the one mentioned just above, the seed element comprises a drum forming the wall thereof, the holes being arranged in a plurality of axially spaced-apart arrays distributed in the circumferential direction.

As described initially, disc-shaped and drum-shaped seed elements, respectively, are the two most important main types of seed elements in agricultural machines of the present kind. These are therefore important embodiments, and where the selection of type of seed element is determined by the operation conditions in question, taking into consideration the advantages and disadvantages of the respective type.

According to a preferred embodiment in case of a drum-shaped seed element, the cover means comprises a strip.

A strip-shaped cover means is particularly suitable for sealing connection to the drum shape and achieves the function of sealing thereto in both a simple and efficient way.

According to an additional preferred embodiment, the cover means comprises a plurality of strips, each strip being arranged covering against only one array of holes.

This gives the advantage that if the cover means locally is exceptionally worn, only a part of the same needs to be replaced. With one strip per hole array, it is also easier to ensure that the abutment pressure becomes uniform upon the mounting.

According to an alternative preferred embodiment, each strip is arranged covering against at least two arrays of holes.

Although this embodiment cannot fully utilize the advantages of the embodiment mentioned just above, it may from other points of views be expedient with strips that cover two or more hole arrays. The mounting becomes simpler, and by it becoming a fewer number of slits between adjacent strips, the sealing capacity will be improved. The alternative that a single wide strip covers all hole arrays falls also within the scope of this embodiment.

The above-mentioned advantageous embodiments are defined in the claims depending on claim 1. It should be emphasized that additional preferred embodiments naturally may consist of all feasible combinations of the above-mentioned preferred embodiments.

The invention also concerns an agricultural machine that comprises a plurality of sow housings according to the present invention, particularly according to any one of the preferred embodiments of the same. An agricultural machine according to the invention has advantages of the corresponding kind as the invented sow housing and the preferred embodiments of the same and that have been described above.

The invention is described in more detail by the subsequent detailed description of embodiment examples of the same, reference being made to the appended drawing figures.

BRIEF DESCRIPTION OF THE DRAWINGS

FIG. 9 is a simplified perspective view of an alternative embodiment example of the detail in FIG. 7.

FIG. 10 is a section right through a cover means according to an embodiment example of the invention.

DESCRIPTION OF EMBODIMENT EXAMPLES

Figure 1:
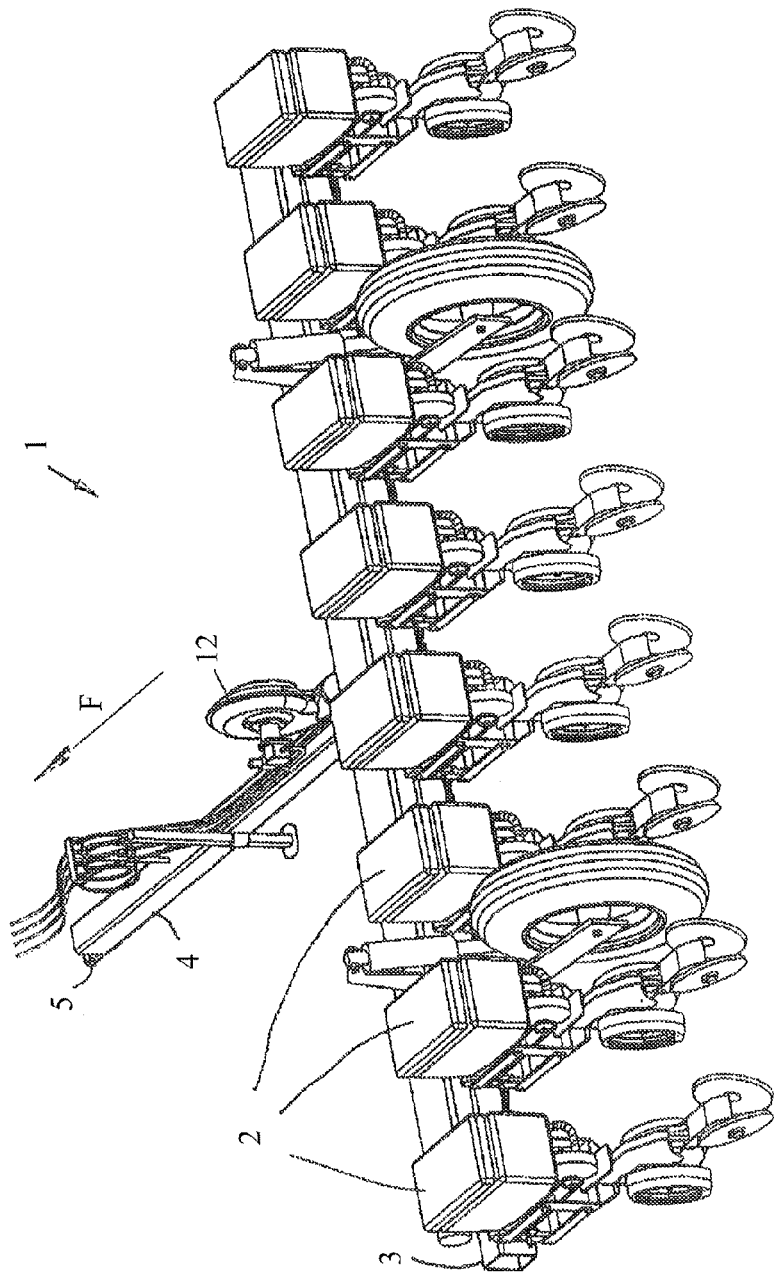
FIG. 1 is a perspective view of an agricultural machine according to a first embodiment example of the invention.

FIG. 1 shows a perspective view of an agricultural machine in the form of a planter 1 according to an embodiment example of the invention. The planter embraces a number of, in this example eight, drilling units 2, each one of which attached to a transverse steel joist 3. By means of a coupling means 5, arranged at a free end of a longitudinal beam 4, the planter is arranged to be coupled behind a traction vehicle and propagated in a direction indicated by the arrow F in FIG. 1. During the motion of the machine 1 across the soil that is to be sown, each one of the drilling units 2 is arranged to form a drill furrow in the direction of travel of the machine, in order to place one seed at a time along the drill furrow to form a row of seeds in the direction of travel F of the machine, as well as to close the furrow. Via overhead wires, a fan 12 is arranged to supply compressed air to each drilling unit 2, for purposes that will be described below.

Figure 2:
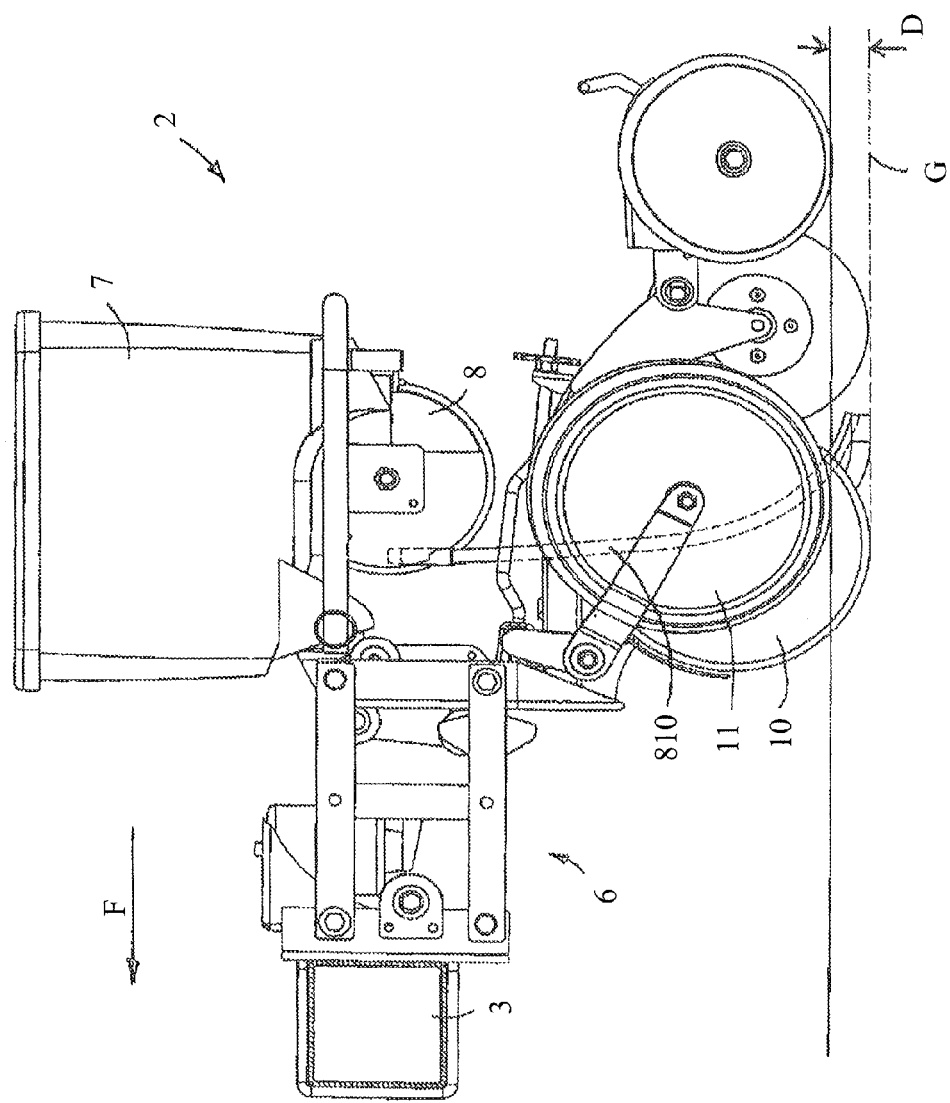
FIG. 2 is a side view of a detail in FIG. 1.

FIG. 2 shows a side view of a one of the drilling units 2. By means of a link device 6, this is connected with the transverse joist 3. The drilling unit 2 embraces a seed bin 7 that communicates with a seed metering device 8 described in more detail below and arranged to, via a distribution means 810, (in FIG. 2 represented by broken lines), distribute one seed at a time to a drill furrow G in the ground.

The drilling unit 2 embraces a support device, which comprises the distribution means 810, and on which a drill furrow-forming device comprising two rotatable discs 10 (only one of which is visible in FIG. 2) is mounted and arranged to form the drill furrow G. In this example, the discs 10 are placed beside each other in essentially the same location in the intended direction of travel F of the machine. The discs 10 may, however, alternatively be mutually displaced in the intended direction of travel of the machine. The discs 10 are mutually angled and orientated so that they diverge mutually rearward and upward. When using the machine, the discs 10 are arranged to rotatingly partly penetrate down into the ground to an adjustable depth D, and by said mutual divergence bring soil to the sides for the formation of the drill furrow G, a lower mouth of the distribution means 810 being situated immediately behind the engagement of the discs 10 with the ground. The mutual divergence rearward and upward of the discs means that their periphery is as closest to each other in the area where they penetrate down into the ground.

In this example, the drilling unit 2 embraces also here finishing members, not described in more detail, arranged to close the drill furrow G. The drilling unit 2 may also embrace preparing members not shown in FIG. 2, as well as protecting members between the lower mouth of the distribution means 810 and the engagement of the discs 10 with the ground.

The drilling unit 2 is arranged to be carried by two supporting wheels 11, situated on each side of the pair of discs 10, the wheel shafts of the supporting wheels 11 being situated somewhat behind the disc shafts in the intended direction of travel F of the machine. More precisely, the supporting wheels 11 are situated on both sides of the pair of discs 10, as seen transverse to the intended direction of travel F of the machine 1, as well as in a vicinity of the respective disc 10, and are arranged to, via the use of the machine 1, scrape off soil and the like that sticks to the respective disc 10. According to prior art, the sowing depth D is adjustable by adjustment of the height of the supporting wheels 11 in relation to the discs 10.

Figure 3:
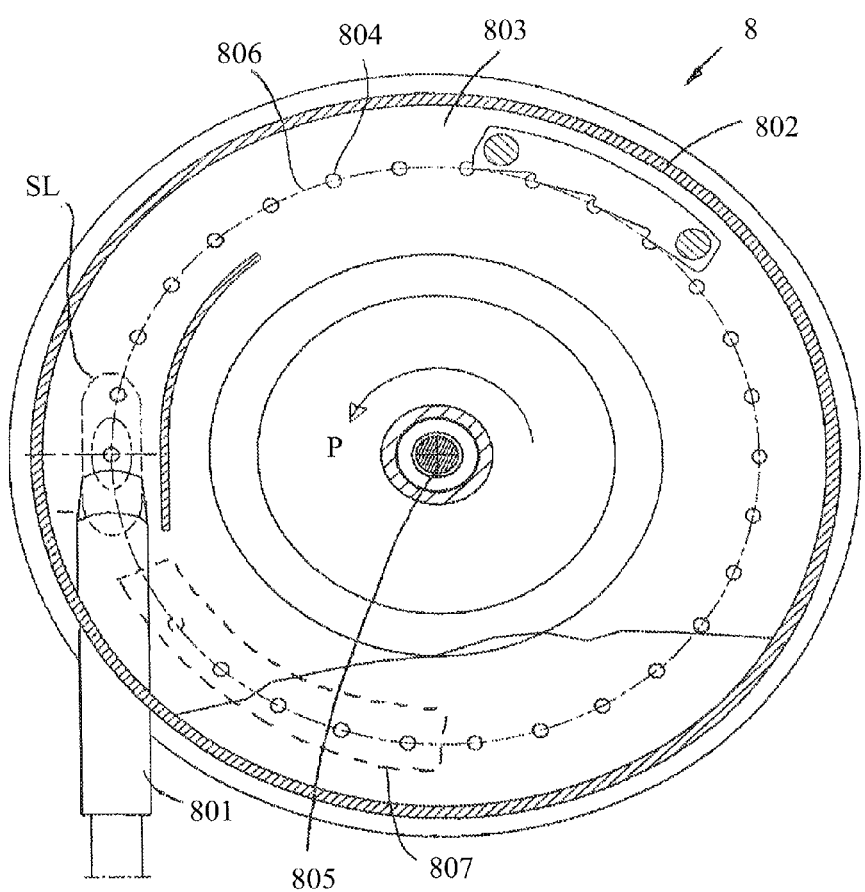
FIG. 3 is a perspective view of a detail in FIG. 2.

FIG. 3 shows a perspective view of a vertical section, parallel to the direction of travel of the agricultural machine, of the seed metering device 8. The same embraces a cylindrical casing 802 as well as a seed metering line 801 that is directed downward from the casing and communicates with the distribution means 810 (FIG. 2).

The seed metering device 8 embraces a seed element 803, in the form of a round seed disc 803 that is arranged essentially concentrically in the casing 802.

During use, seeds are fed from the seed bin 7 (FIG. 2) by gravity into the casing 802 on one side of the seed disc 803. By means of a driving device, the seed disc 803 is arranged to rotate its plane around a mainly horizontally orientated seed metering shaft 805, as indicated in FIG. 3 by the arrow R. In a circular seed transport area 806 concentric with the seed metering shaft 805 and at a distance from the seed metering shaft 805, the seed disc 803 is arranged to catch, transport and release seeds. More precisely, in the seed transport area 806, the seed disc 803 has a plurality of through holes 804 situated at the same radial distance from the seed metering shaft 805, in this example in the vicinity of the periphery of the seed disc 803, which holes 804 are distributed equidistantly from each other in the circumferential direction of the seed disc 803. A fan 12 (FIG. 1) communicates with the seed metering device 8, and the seed metering device 8 is arranged to, by means of the fan, produce a pressure drop across a portion of the seed disc 803. Thanks to the pressure drop, a seed gets caught at each hole 804 and transported toward the seed metering line 801. The seed metering device 8 is arranged to release the seeds on a side of the seed metering shaft 805 on which the seeds are transported by the seed disc 803 at a downwardly directed component of velocity in relation to the seed metering shaft 805. More precisely, at the seed metering line 801, in what here is called a release area SL (indicated in FIG. 3 by broken lines), the pressure drop is, by means of pressure-separating device (not shown), e.g., in the form of a flexible wall, smaller than in other parts of the seed metering device 8. Because of the decreased pressure drop, the seeds come loose from the respective seed engagement hole 804, in the release area SL, and fall down through the seed metering line 801.

Within the scope of the invention, the seed metering device 8 may be arranged in a large number of alternative ways. For instance, as also is mentioned below, the seed metering device 8 may be orientated in alternative ways in relation to the agricultural machine, e.g., so that the seed disc 803 extends mainly in a plane transverse to the direction of travel of the agricultural machine.

In the embodiment described with reference to FIG. 3, in which the seed metering shaft 805 is mainly horizontal, the release area SL is situated mainly in the same vertical position as the seed metering shaft 805, so that the seed transport area 806 has a maximum downwardly directed component of velocity in the release area SL. Alternatively, the release area SL may be situated above or below the seed metering shaft 805, but on a side of the seed metering shaft on which the seeds are transported at a downwardly directed component of velocity in relation to the seed metering shaft.

Between the side of the seed disc 803 that is visible in FIG. 3 and its opposite side, there is accordingly a pressure difference, with the pressure being higher on the visible side. From a seed from the collection in the bottom of the casing 802 getting caught at one of the holes 804 and during its transportation to the release area SL, each hole is plugged up by the respective seed so that very little air passes through the holes. A cover disc 807 extends in the direction of rotation from the release area SL and a distance into the area where the seeds 91 are accumulated. The cover disc 807 abuts sealingly against the seed disc 803. Thereby, neither in this sector, no considerable passage of air through the holes 804 takes place. The holes 804 are thereby in principle blocked during the entire revolution so that only negligible compressed-air consumption arises due to air flow through the holes 804.

Figure 4:
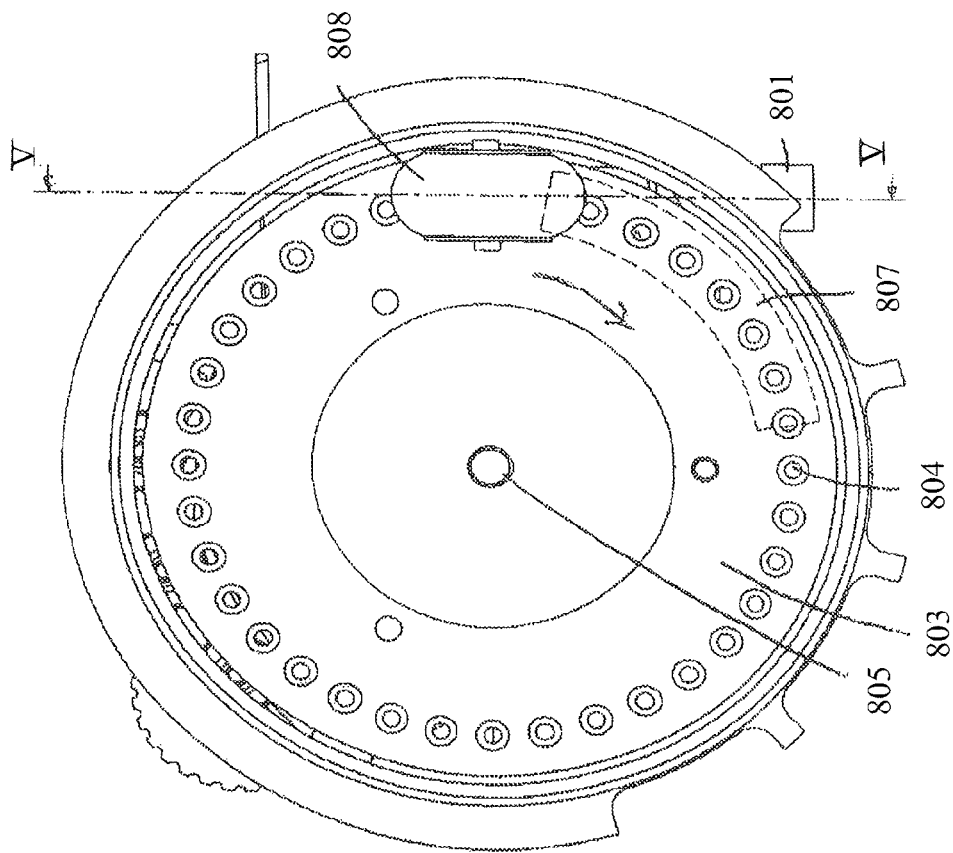
FIG. 4 is a side view of a detail similar to the one in FIG. 3.

FIG. 4 is a side view of the device similar to the one in FIG. 3 as seen from the opposite side. The release of seeds is brought about by a roll 808 with the rotation axis perpendicular to the seed metering shaft 805 of the seed disc abutting against the seed disc 803 on the side that is opposite the seeds at the release area SL.

The cover disc 807 that is behind the seed disc 803 in this view is marked by dashed lines.

Figure 5:
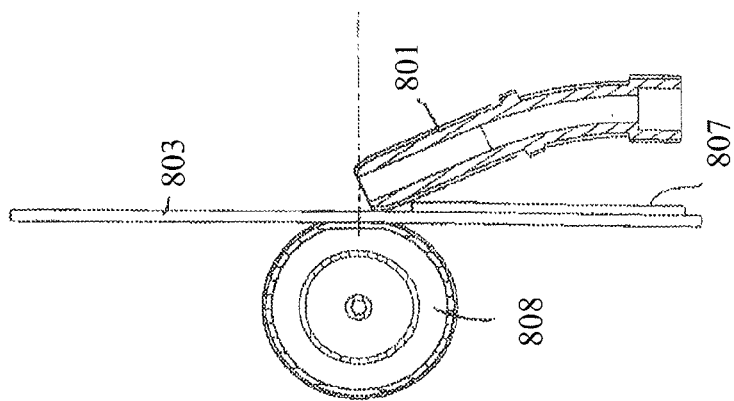
FIG. 5 is a section along the line V-V in FIG. 4.

FIG. 5 is a section along the line V-V in FIG. 4, where it is seen how the roll 808 co-operates with the seed metering line 801 in the release area. Accordingly, the seeds are handled on the side, in this figure the right one, where also the cover disc 807 is arranged. The higher air pressure is on the right side of the seed disc.

Figure 6:
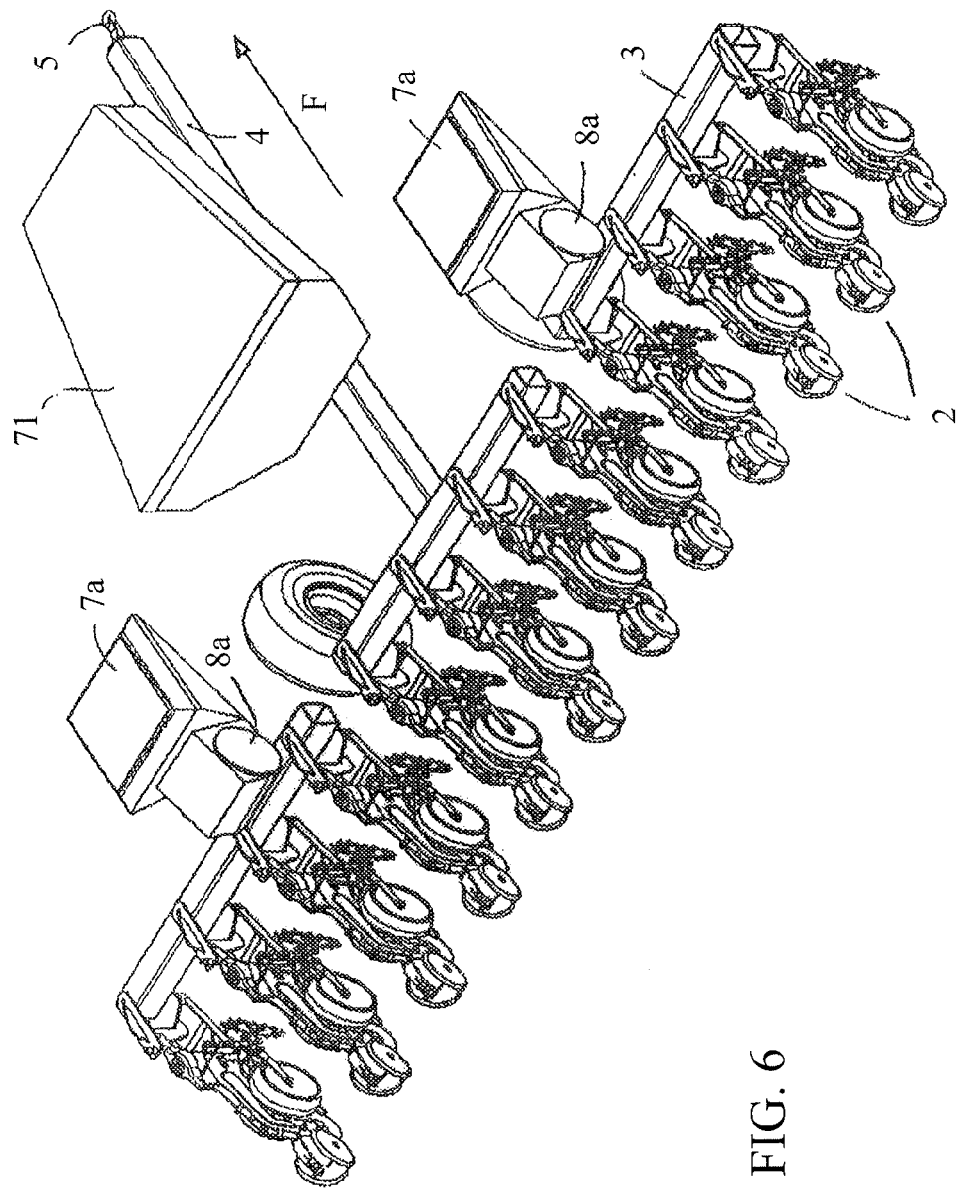
FIG. 6 is a perspective view of an agricultural machine according to a second embodiment example.

FIG. 6 illustrates a second embodiment example of an agricultural machine according to the invention. Like the example in FIG. 1, the machine comprises a carrying structure having a longitudinal beam 4 and a transverse joist 3 and having a coupling means 5 for the coupling to a traction vehicle. In the figure, the joist 3 is broken to save room in the figure, but consists of a continuous joist of approximately the double extension compared to what is seen in the figure. To the joist, there are attached a number of, for instance 16, drilling units 2 of a similar kind as has been described in connection with FIG. 2. In this embodiment example, a common seed bin 7a is arranged for a plurality of drilling units 2. For instance, each seed bin 7a may serve eight drilling units 2, wherein the number of seed bins will be two. A central seed bin 71 is arranged on the longitudinal beam 4. The central seed bin 71 communicates via distribution lines (not shown) with the seed bins 7a. Each one of these is provided with a seed metering device 8a for the output of seeds to a plurality of seed metering lines 801a, in the present example eight ones (see FIG. 7). Each seed metering line 801a communicates with a drilling unit 2.

The pneumatic system requisite for the seed distribution and maneuvering of the seed metering devices 8a and comprising the fan and lines is for the sake of clarity omitted in FIG. 6.

Figure 7:
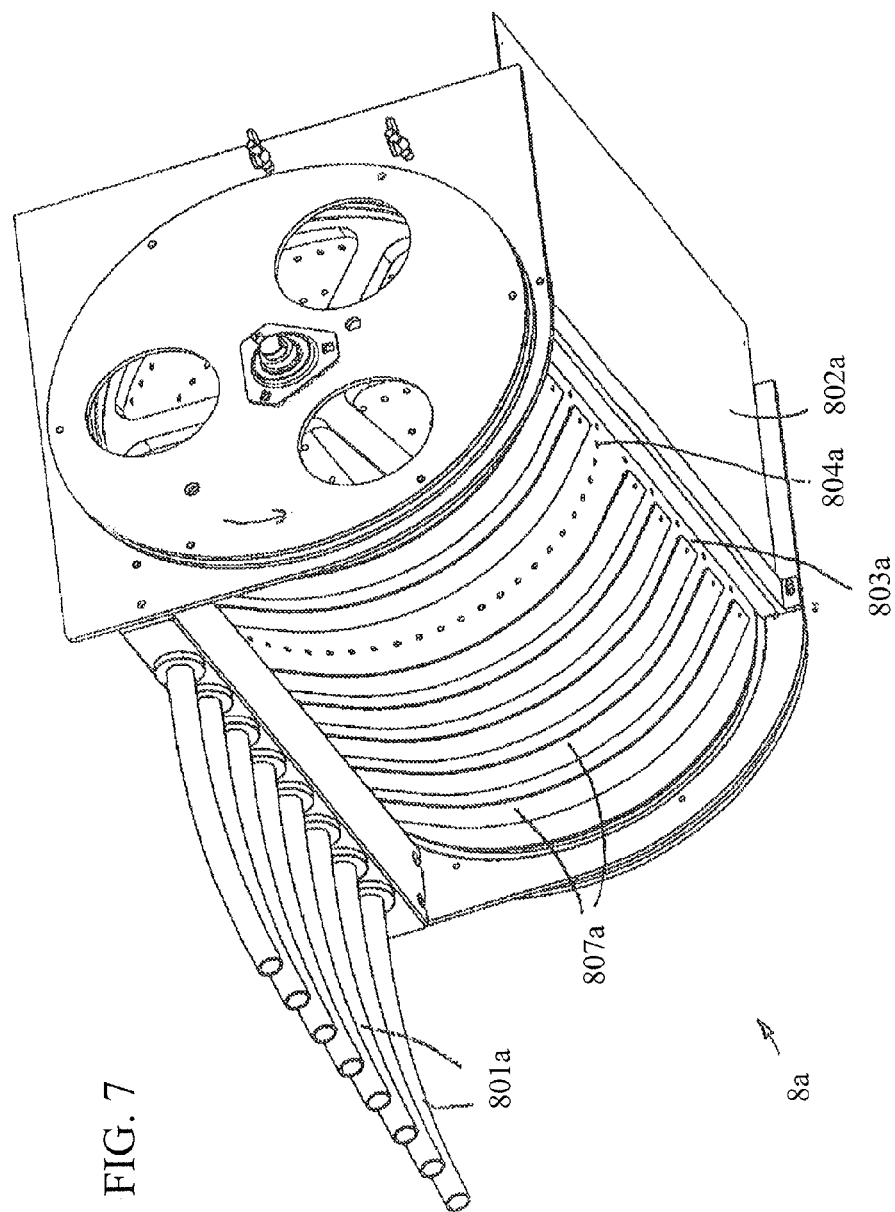
FIG. 7 is a perspective view of a detail in FIG. 6.
Figure 8:
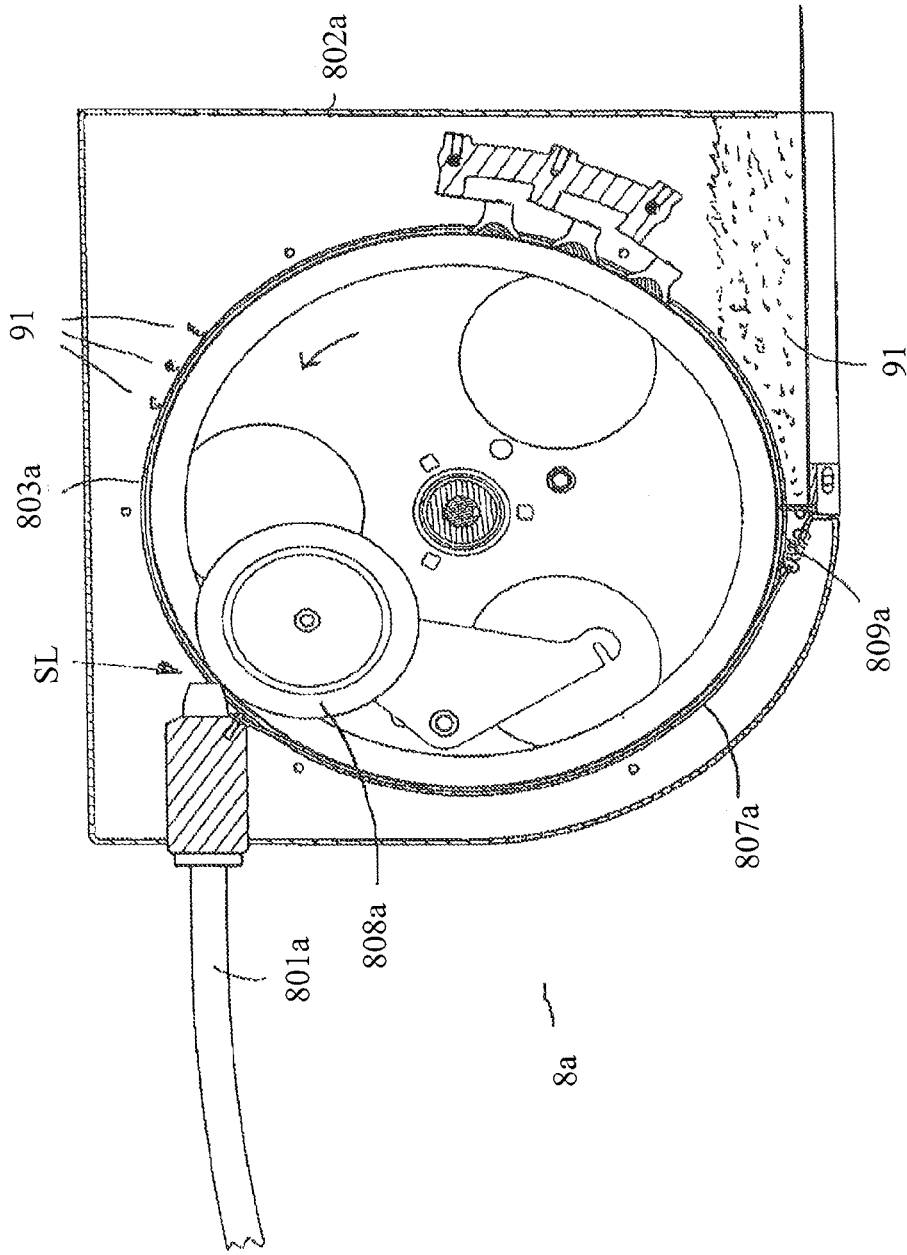
FIG. 8 is a radial section through FIG. 7.

The design of the seed metering device 8a is seen in more detail in FIG. 7, which is a perspective view of such a one, and FIG. 8, which is a section through the device in FIG. 7 perpendicular to the shaft of the drum. The seed metering device 8a comprises a rotating drum 803a that forms a wall between a pressurized area outside the wall and an area at a lower pressure inside. The drum 803a has eight arrays of holes 804a. Each hole array runs in the circumferential direction, and the hole arrays are axially distributed along the drum. One of the hole arrays is assigned to each seed metering line 801a.

A strip 807a is applied for the abutment against the respective hole array across a delimited sector. In the figure, one of the strips is removed to make visible the hole array. The strips 807a form together a cover means for the holes 804a that covers the holes during a part of a revolution of the drum.

From each respective seed bin 7a (see FIG. 6), seeds are fed into a casing 802a surrounding the drum and are accumulated there in a large quantity in a corresponding way as is seen in FIG. 8. By a technique corresponding to the one described in connection with FIG. 3, seeds are captured by the holes 804a in the drum 803a due to the higher pressure on the outside of the drum. This occurs in an area immediately next in the direction of rotation from the position where the strips 807a have their lower respective ends in FIGS. 7 and 8.

The seeds are transported therefrom on the outside of the drum with one seed in each hole up to the release area SL, wherein they are retained by the air pressure difference. At the release area SL, a roll 808a is arranged at each hole array and that rollingly plugs up the hole that is on the outside of this hole. Thereby, the retention force from the air pressure is interrupted, the seed being loosened and by the positive pressure being blown into the appurtenant seed metering line 801a. Instead of a roll 808a, a roller that extends along the entire drum and plugs up all hole arrays may be used.

From the release area SL where the seeds are removed and up to the area where new seeds are captured by the drum, the holes are covered by the strips 807a. Accordingly, the holes of the drum are sealed the entire revolution, thereby the pressure loss through the holes being reduced.

Each strip 807a is fixedly secured at one of its ends, and at its other end attached in the housing via a tension spring 809a.

FIG. 9 illustrates an alternative embodiment of how the cover means 807a is constructed. In this case, it consists of a single strip that extends laterally across the entire drum, thereby covering all arrays of holes 804a. Naturally, intermediate types of these alternatives may be conceivable, with each strip covering two or more arrays of holes.

FIG. 10 is an enlarged partial section through a cover means according to the invention and is applicable to the disc 807 described in connection with FIGS. 3 and 4 as well as to the strips 807a described in connection with FIGS. 7 and 8.

The cover means is composed of two layers. A first layer is abutment layer 809 and a second layer is support layer 810. The abutment layer is of a material that has a low coefficient of friction, e.g., a plastic material such as polytetrafluoroethylene (PTFE). The support layer 810 is of a material that imparts sufficient strength to the cover means, e.g., a metal. When the cover means is in the form of strip(s) in accordance with the example in FIGS. 8 and 9, it may in certain cases be suitable to form the same to be resilient. Then it can be provided with a pre-processed circular arc shape of a radius somewhat smaller than the outer radius of the drum. A bias may alternatively be obtained by selecting a material for the support layer 810 that has a certain elasticity in the longitudinal direction.

The invention claimed is:

1. A sow housing for singulated sowing of seeds, comprising a seed bin and a rotating seed element having a wall that has a plurality of through holes, each hole being arranged to, during a first part of the revolution of the hole, retain a seed as a consequence of pressure difference between the two sides of the wall, which pressure difference is accomplished by a positive pressure being maintained on the side of the wall where the seeds are situated, and each hole being arranged to, during a second part of the revolution of the hole, pass a release area (SL) in which a roll or a roller is arranged at each hole array or all hole arrays and that rollingly plugs up the hole that is on the outside of this hole for the removal of seed from the hole, wherein a cover is arranged on the same side of the wall at which the seeds are retained and is arranged to cover each hole during a third part of the revolution of the hole from the release area (SL) where the seeds are removed and up to the area where new seeds are captured by the drum, which third part is ⅛-½ of a revolution.

2. The sow housing according to claim 1, wherein said third part is ¼-½ of a revolution.

3. The sow housing according to claim 1, wherein the cover is arranged to abut resiliently against the wall.

4. The sow housing according to claim 3, wherein the cover is resilient.

5. The sow housing according to claim 3, wherein a separate spring means is arranged to bias the cover means against the wall.

6. The sow housing according to claim 1, wherein the cover is of at least two different materials.

7. The sow housing according to claim 1, wherein the cover at least partly is of a plastic material having a reduced friction, on the side that faces the seed element.

8. The sow housing according to claim 1, wherein the seed element comprises a disc forming said wall.

9. The sow housing according to claim 1, wherein the seed element comprises a drum forming said wall, and that the holes are arranged in a plurality of axially spaced-apart radii running in the circumferential direction.

10. The sow housing according to claim 9, wherein the cover comprises at least one strip.

11. The sow housing according to claim 10, wherein the cover comprises a plurality of strips, each strip being arranged covering against only one array of holes.

12. The sow housing according to claim 10, wherein each strip is arranged covering against at least two arrays of holes.

13. An agricultural machine comprising a plurality of the sow housings according to claim 1.

* * * * *